(12) United States Patent
Pawlak, III et al.

(10) Patent No.: US 7,467,657 B2
(45) Date of Patent: Dec. 23, 2008

(54) COMPACT MODULAR CPU COOLING UNIT

(75) Inventors: John Lawrence Pawlak, III, Orchard Park, NY (US); Ilya Reyzin, Williamsville, NY (US); Mohinder Singh Bhatti, Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 379 days.

(21) Appl. No.: 11/448,591

(22) Filed: Jun. 7, 2006

(65) Prior Publication Data

US 2007/0284094 A1 Dec. 13, 2007

(51) Int. Cl.
F28F 7/00 (2006.01)
F28D 15/00 (2006.01)
H05K 7/20 (2006.01)

(52) U.S. Cl. .................. 165/80.4; 165/104.33; 165/122; 361/699

(58) Field of Classification Search ............... 165/80.4, 165/104.33, 104.34, 121, 122; 361/695, 361/699, 702; 257/714
See application file for complete search history.

(56) References Cited

U.S. PATENT DOCUMENTS

| 5,597,035 | A | 1/1997 | Smith et al. |
| 6,263,957 | B1 | 7/2001 | Chen et al. |
| 2004/0052048 | A1 | 3/2004 | Wu et al. |
| 2004/0125561 | A1* | 7/2004 | Gwin et al. .................. 361/699 |
| 2006/0021737 | A1* | 2/2006 | Lee et al. .................... 165/80.4 |
| 2006/0249278 | A1* | 11/2006 | Liu et al. .................... 165/80.4 |
| 2007/0023167 | A1* | 2/2007 | Liu et al. .................... 165/80.4 |
| 2007/0029069 | A1* | 2/2007 | Duan ........................ 165/80.4 |
| 2007/0034359 | A1* | 2/2007 | Liu et al. ................ 165/104.31 |
| 2007/0109739 | A1* | 5/2007 | Stefanoski .................. 361/687 |
| 2007/0163759 | A1* | 7/2007 | Klein et al. ................. 165/121 |

FOREIGN PATENT DOCUMENTS

| DE | 20 2004007907 | 10/2004 |
| DE | 1 519 645 | 3/2005 |

OTHER PUBLICATIONS

European Search Report dated Sep. 25, 2007.

* cited by examiner

*Primary Examiner*—Tho v Duong
(74) *Attorney, Agent, or Firm*—Patrick M. Griffin

(57) ABSTRACT

A modular CPU cooling unit designed to fit within the available space within an existing box or cabinet containing a CPU. The fan, pump and liquid to air cross flow heat exchanger are fitted within the available volume with the fan spaced away from the heat exchanger a suitable distance to pull air through the entire face area of the heat exchanger, even though it is considerably larger than the fan.

5 Claims, 6 Drawing Sheets

COMPACT MODULAR CPU COOLING UNIT

TECHNICAL FIELD

This invention relates to electronic cooling assemblies in general, and specifically to a self contained, compact and modular cooling unit for a CPU or similar heat producing electronic component.

BACKGROUND OF THE INVENTION

Increasingly powerful electronic components, such as computer chips or central processing units (CPUs), produce higher wattages of waste heat, which must be continually removed in order to allow the component to operate efficiently. Generally, one planar surface of such a component is exposed, usually indirectly exposed through a thin cover or "lid," and heat is extracted by some type of add on cooling assembly that is thermally bonded to the exposed surface. Early on, a relatively simple so called "heat sink," generally a metal plate with cooling fins, was bonded to the exposed surface of the component, and a fan mounted somewhere on or inside the computer case forced air over the cooling fins and out of the case. This worked sufficiently well until CPUs became more powerful, and liquid cooling became necessary. With liquid cooling, the simple, solid plate of the air system is replaced by a so called cold plate, a low profile, hollow box like structure with a lower surface to which the component is bonded, and a finned or channeled inner volume through which coolant is continually pumped to extract heat that is conducted through the lower surface. The coolant exiting the cold plate runs through a liquid to air heat exchanger, which may be passive, but which generally has air blown across it by a fan.

Early liquid cooling systems were often retro fitted add ons favored by the so called "over clockers" who ran CPUs at unconventionally high speeds, and the air to liquid heat exchanger fan unit was often mounted outside the computer case, and sometimes the liquid pump as well. As production CPUs have begun to approach the same speeds, the liquid pumps, heat exchangers and fan units have generally been designed into the computer case initially, but are still separate components, not particularly compact in their overall configuration, and generally operating essentially independently.

SUMMARY OF THE INVENTION

The subject invention incorporates the cold plate, air to liquid heat exchanger, liquid pump, and associated hoses and fittings into a self contained, modular unit, with superior compactness and utilization of space. A modular unit can be easily attached to each of any number of CPU's within a computer case, with no modification to the case itself. The components cooperate within the modular unit not only to save space, but to create an improved and efficient air flow over the air to liquid heat exchanger.

In the embodiment disclosed, a rectangular base has a central opening below which a cold plate is mounted, presenting the lower surface of the cold plate to be conventionally thermally bonded to the exposed surface of a CPU. The base would be sized to fit within whatever space was originally provided within the computer case for a conventional "heat sink." Generally, there will also be a rectangular box shaped volume available above the conventional heat sink space, as well, and the modular unit of the invention utilizes that available volume to optimal effect to contain the other components of the liquid cooling system. Residing on one side of the base is a fan unit, and sitting atop the fan unit is a liquid pump and the associated fan and pump controls. Stacked one atop the other, these two necessary components occupy a minimum of area and volume. On the other side of the base, a cross flow, liquid-to-air heat exchanger is arranged generally parallel to the fan unit/pump stack, with a face area substantially equal to the area occupied by the stacked fan and pump unit and, therefore, residing within the same available volume. The necessary lines connecting pump, cold plate and heat exchanger run generally vertically within the volume so as to block a minimal portion of the face area of the heat exchanger. An exterior case surrounds the volume, attached to the perimeter of the base, and enclosing and blocking all of the perimeter area of the available volume, except for the outlet of the fan unit and the face of the heat exchanger.

The modular unit is installed within the case by thermally bonding the lower surface of the cold plate and fixing the base to the inside floor of the computer case. Outside air is typically pulled into and pushed out of a computer case by various pre existing fans, independently of whatever extra cooling system is dedicated to the CPUs, so a pre existing cooling air stream is available inside the case for the module. The module is oriented within the case so as to work with, rather than against, the existing interior air flow. When air is pulled into the module by the module fan its only available inlet is through the face of the air to liquid heat exchanger, which occupies essentially one entire side of the module, and through which liquid is continually pumped by the self contained pump unit. The entering air stream is substantially uniform across that face, even though the single fan is considerably smaller in area than the heat exchanger face, and the internal plumbing is arranged so as not to block that flow. There is sufficient heat exchanger capacity to keep the CPU efficiently cooled, and a module may be installed for every CPU in the case, added incrementally as needed.

DESCRIPTION OF THE PREFERRED EMBODIMENT

Figure 1:
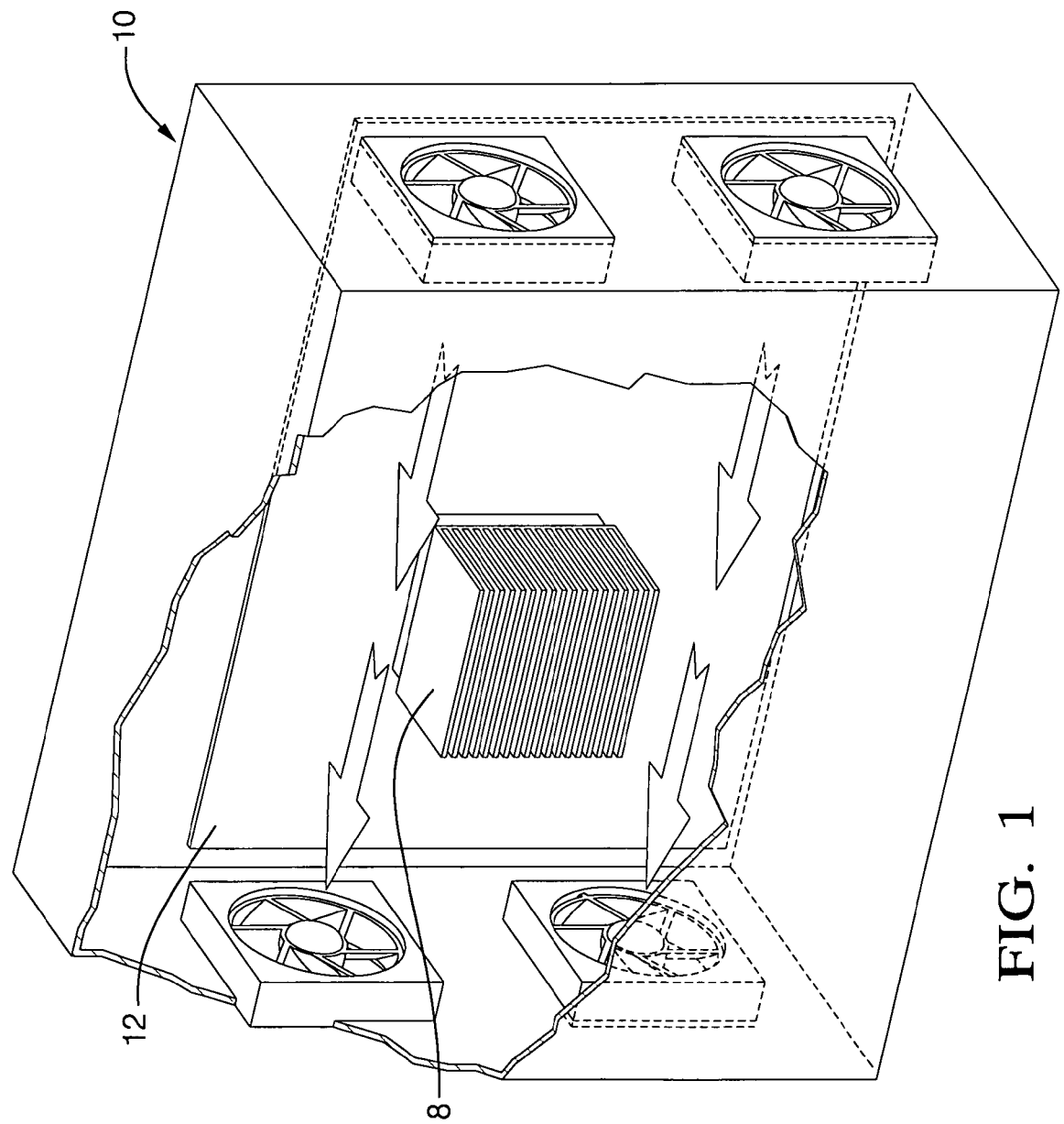
FIG. 1 is a schematic view of a computer case and the location of a CPU, indicating a typical flow of air therethrough.
Figure 2:
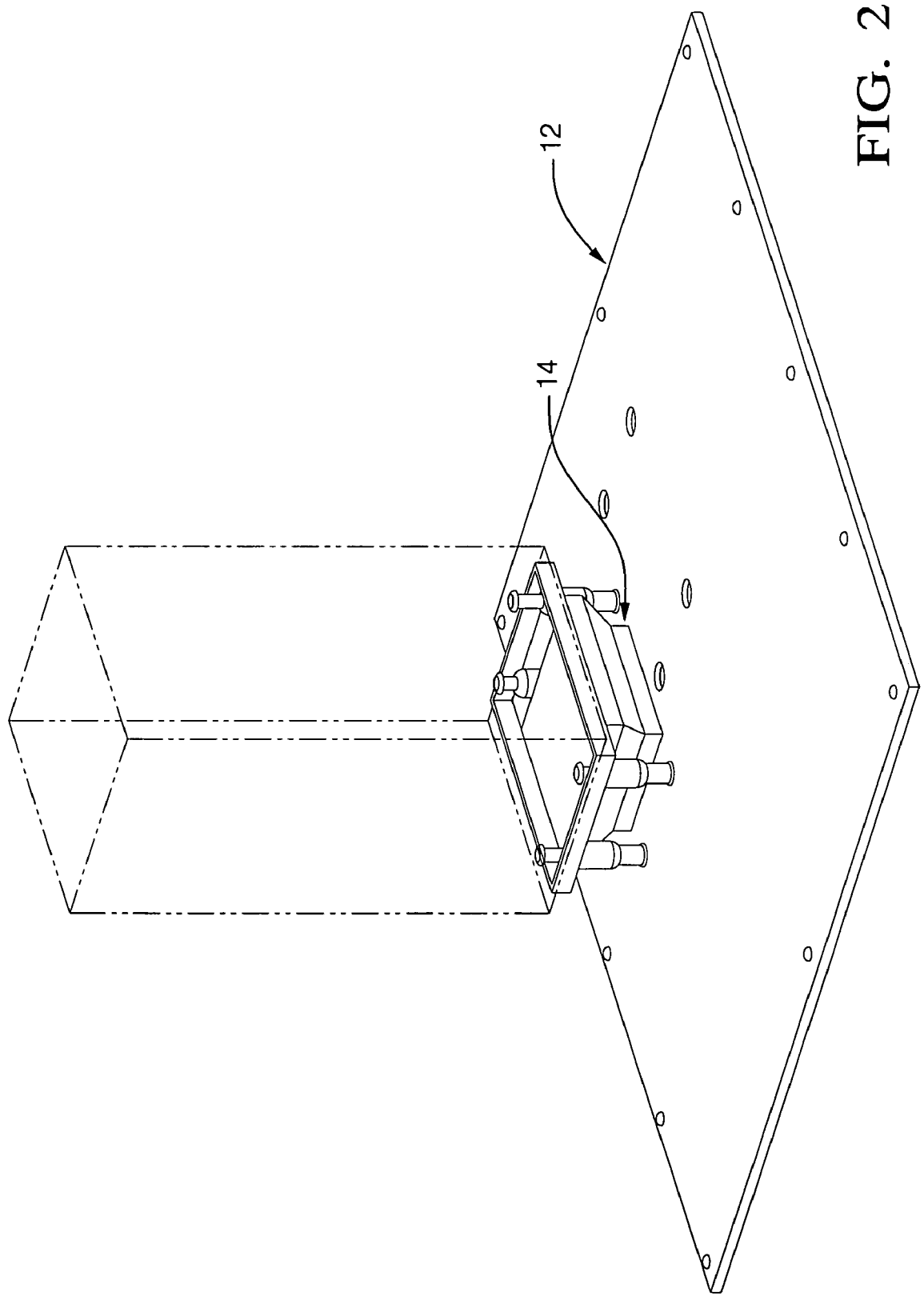
FIG. 2 is a schematic view of a CPU as found within a computer case, showing the available volume above the CPU within a case.

Referring first to FIGS. 1 and 2, the outline of a computer case 10 is shown, essentially a box with a floor in the form of a main or "mother" board 12 to which numerous circuit boards and other components would be fixed, including a CPU as described above, the location of which is indicated generally at 14. Case 10 typically has several pusher and puller fans around its perimeter, as well as screened air inlets and outlets, which continually supply a forced flow of outside air into and out of case 10 to air cool the components inside the box. This pre existing air stream is indicated by the arrows. This internal air flow is used to advantage by the cooling module of the invention, as described below. The cooling of CPU 14 has been typically assisted by a finned heat sink 8 thermally bonded to and clamped to the CPU upper surface, with the fins being exposed to the general air stream within the case 10 itself, similarly to any other heat producing component within the case 10. As a consequence, there is a volume of open space in the shape of a rectangular prism above the CPU 14, extending generally between the floor 12 and the top of case 10, shown in dotted lines in FIG. 2. The module of the invention takes advantage of this available volume.

Figure 3:
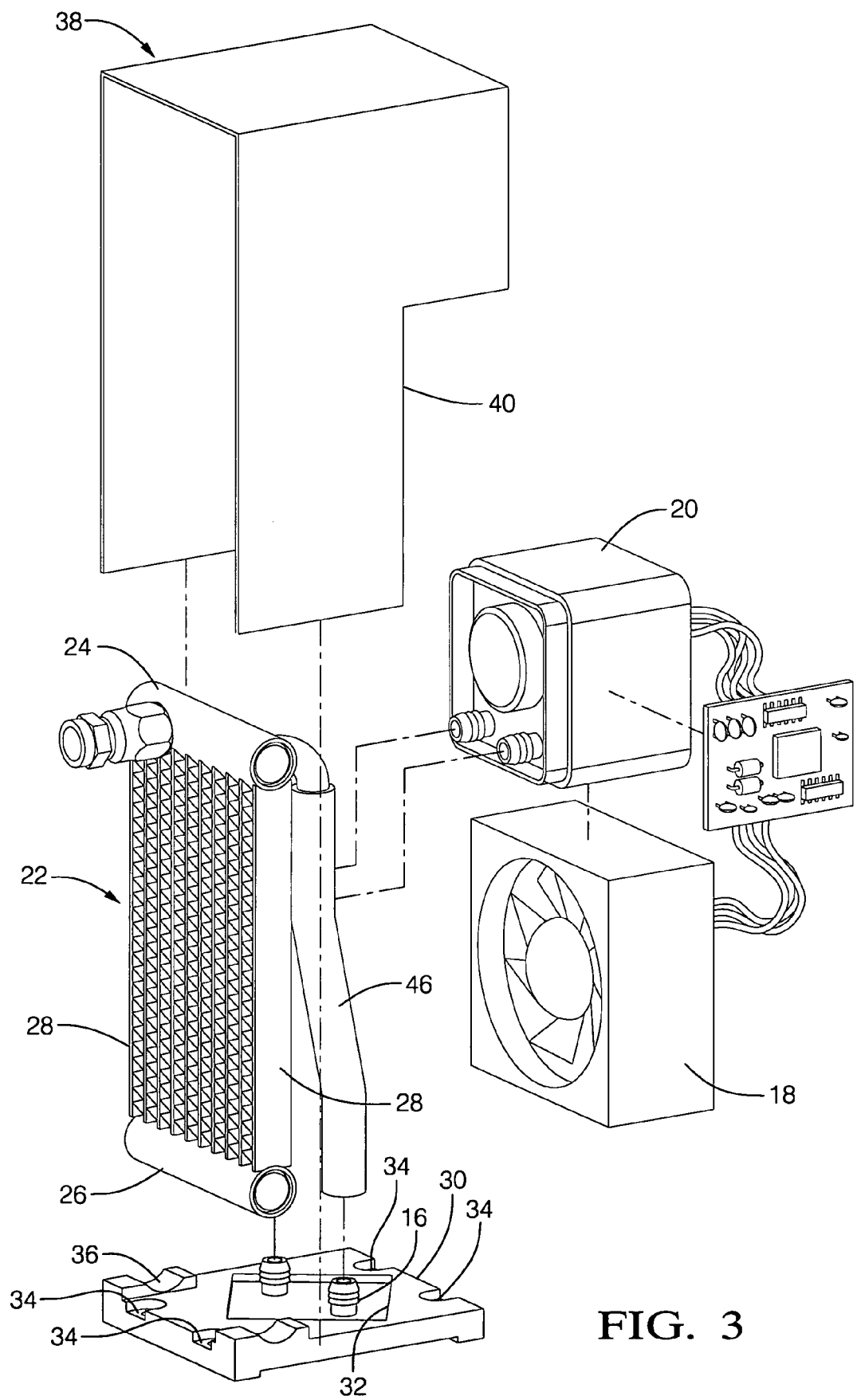
FIG. 3 shows the internal components of a preferred embodiment of the invention, and the external components removed therefrom.

Referring next to FIG. 3, the internal components of the invention, which are, individually, similar to those used in any pumped liquid cooling system, include a cold plate 16, a fan unit 18, a pump and associated control unit 20, and a cross flow heat exchanger, indicated generally at 22. Fan unit 18 is a so-called puller unit, which is designed to pull air through a heat exchanger, rather than push it through. Pump 20 could be any suitable liquid coolant pump, designed to quietly and efficiently pump coolant through the system as demanded. Structural details of the pump 20 and fan unit 18 are not as significant as is their relative size and shape, each also being generally a rectangular prism, smaller than the overall volume noted above, and able to fit within in and on one side of it, when stacked on top of one another. Cold plate 16 is generally a rectangular, shallow box, larger in area than the exposed upper surface of the component to which it is thermally bonded, but smaller, here, than the bottom perimeter of the available volume. Heat exchanger 22 is basically a four sided frame, with upper and lower tank manifolds 24 and 26, and two side tubes 28, which may or may not be active flow tubes. The size of this frame is deliberately made to be roughly equal to an entire side of the subject available volume and, therefore, significantly larger in area than the face of the fan unit 18. Conceptualized differently, the over/under arrangement of the pump unit 20 and fan unit 18 subtends a relatively large total area, significantly larger than the area of the fan unit 18 alone, and this entire larger area is opposed by a parallel face area of the heat exchanger 22. This is highly atypical for a liquid cooling unit, in which the face area of the fan unit or (side by side fan units) is generally sized as close as possible to the face area of the heat exchanger. The external components include a base 30, basically a relatively heavy foundation plate, with a central opening 32, four corner holes 34, and a shallow trough 36 cut into the top front edge, which trough matches the shape of either tank manifold 24 or 26. An outer shroud, indicated generally at 38, is a box like structure, with the same basic size and shape as the volume indicated in FIG. 2. Shroud 38 is open entirely at the bottom, and on one side, with a cutout window 40 at the lower end of the opposite side, but enclosed on every other surface.

Figure 4:
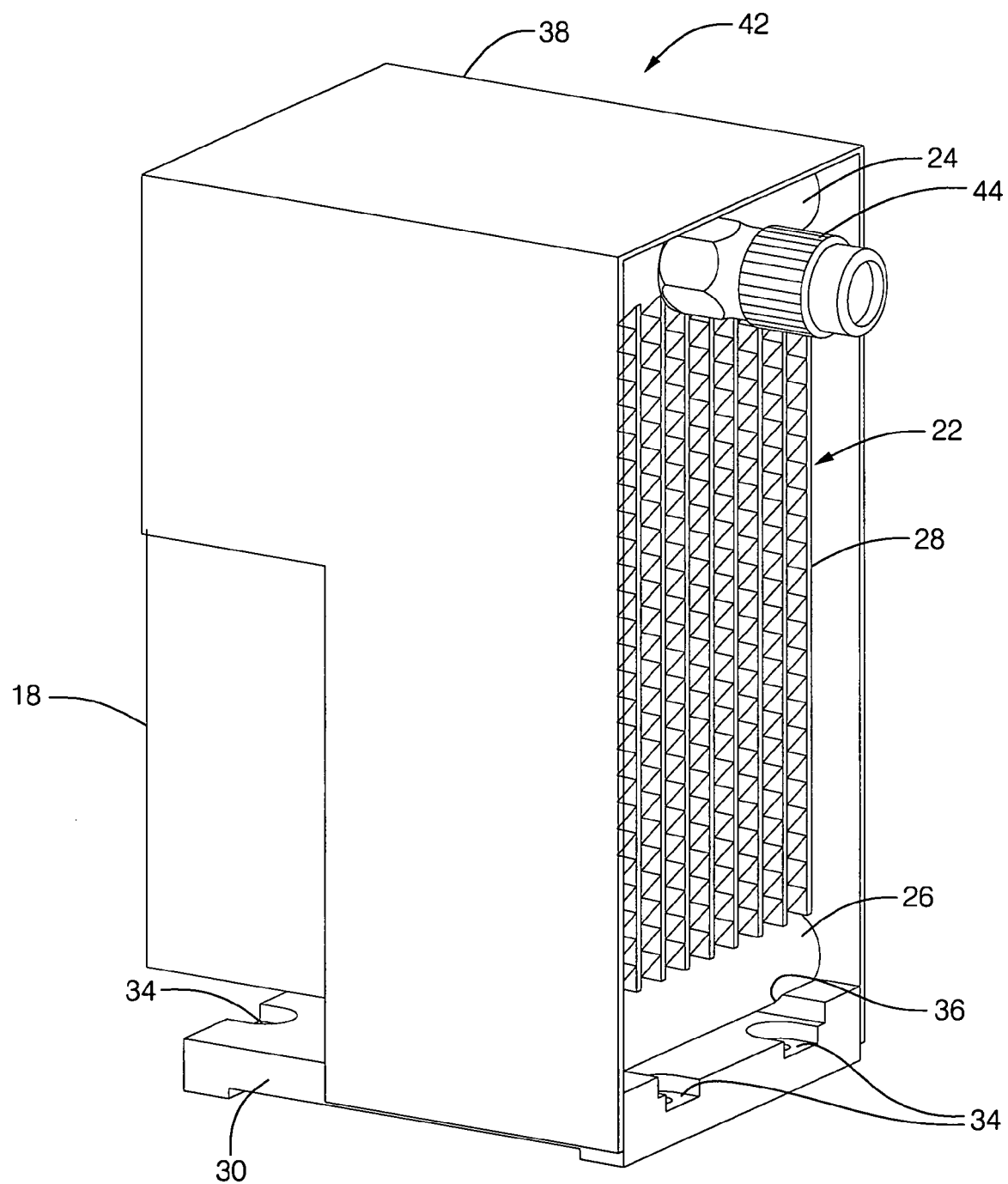
FIG. 4 is a perspective view of a preferred embodiment of the cooling module of the invention, showing the heat exchanger face.
Figure 5:
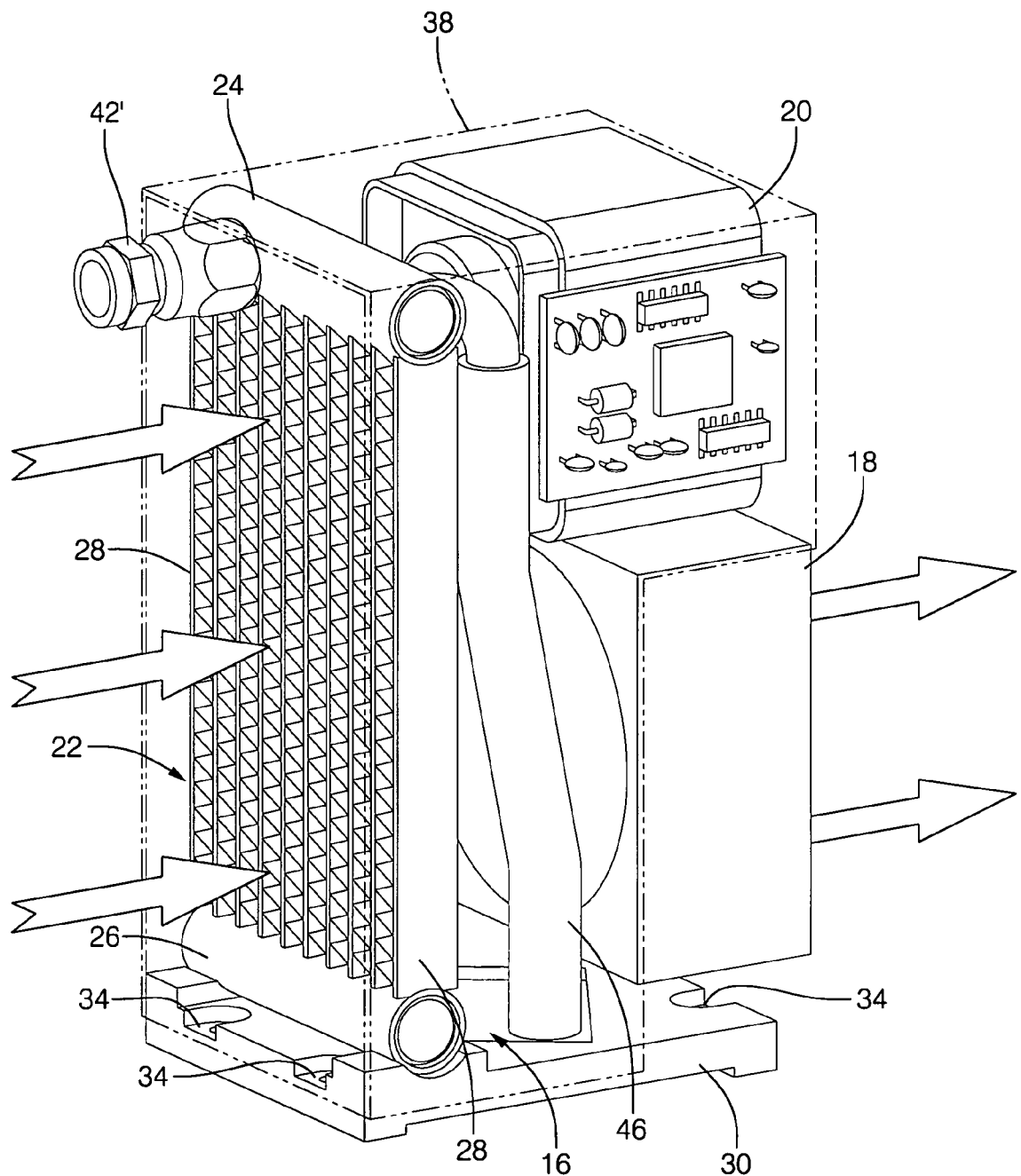
FIG. 5 is a schematic view of one module clamped to a CPU, and illustrating the operational air flow.

Referring next to FIGS. 4 and 5, the basic purpose of shroud 38 is to close off all of the perimeter surface area of the volume illustrated in FIG. 2, as well as to enclose and contain the individual internal components, and to thereby create a module, indicated generally at 42. Specifically, the bottom edge of shroud 38 is attached to the perimeter edge of base 30, and the fan unit 18 is fixed into the window 40, and above the upper surface of base 30, clear of the base central opening 32. Typically, this would be done with threaded fasteners routed through the wall of shroud 38 and into the relevant components, tightly enough to create a good air seal. Pump unit 20 is installed just above fan unit 18 in an aligned, vertical stack that uses the available space efficiently. The heat exchanger 22 is installed with its lower tank 24 seated closely in base trough 36, its upper tank 26 against the inner surface of the top of shroud 38, and its side tubes 28 against the inner surface of the sides of shroud 38, thereby held firmly in place and filling the entire open side of shroud 38. If desired, the top of shroud 38 may be stamped with indentations to trap the upper tank 26 of heat exchanger 22, thereby allowing it to be installed fastener free. In the embodiment shown, a fill or charge port 44 also opens to the upper tank 26, to charge the system with coolant at a high point, thereby obtaining a solid, air free fill. The cold plate 16 is fixed to the underside of base 30, below the central opening 34, so that any inlets into or out of the top of cold plate 16 are accessible to the interior of shroud 38. There is room between heat exchanger 22 and the stack of fan unit 18 and pump 20 for suitable lines 46 to interconnect cold plate 16, heat exchanger 22, and pump 20, and these lines 46 are deliberately routed toward the inner sides of shroud 38, so as to leave the interior space between fan unit 18 and heat exchanger 22 largely unobstructed. The module 42 is fixed to the case floor 12 by a suitable spring biased clamping mechanism, not illustrated, engaging the base corner holes 36. The weight of base 30 and the module 42 thereby cooperates to help bias and thermally bond the lower surface of cold plate 16 against the exposed surface of the CPU 14. In effect, the module base 30 and cold plate 16 occupy the volume that would have been occupied by a typical air cooled "heat sink, while the rest of module 42 fits within the otherwise unused and available block of space above that, as described above.

Referring still to FIG. 4, module 42 does more than efficiently and compactly contain the components of a liquid cooling system within a modular structure. Module 42 is oriented so as to work with, rather than against, the existing air stream inside case 10. The puller fan unit 18 pulls air out of the interior of shroud 38, thereby causing air to be pulled inside shroud 38 through the only available inlet, which is through the face of the heat exchanger 22. Pump 20 and its associated controls act to pump liquid through cold plate 16 and heat exchanger 22 in response to a measured temperature or any other desired control parameter, which coolant continually exchanges heat to the air drawn through. Fan unit 18, although significantly smaller in area than the face of heat exchanger 22, and asymmetrically arranged relative thereto, is spaced at the correct, critical distance therefrom so as to pull air from inside case 10 substantially completely, and evenly, through the entire face of heat exchanger 22. This critical distance will vary from case to case, but, in general, fan unit 18 is placed on the side of the available volume opposed to the face of heat exchanger 22, the only air inlet to the module, and at a distance that is not so far that the flow resistance is high, but far enough that the air drawn into the face of heat exchanger 22 is not concentrated just at the lower end, that is, concentrated in from of fan unit 18, as it would with a pusher fan. Therefore, substantially the entire available area between the CPU 14 the top of case 10 is utilized, and the air stream within case 10 is concentrated and targeted more efficiently and actively at the task of cooling CPU 14 than with the prior approach of simply passively exposing a simple heat sink or heat pipe to the existing air flow inside case 10.

Figure 6:
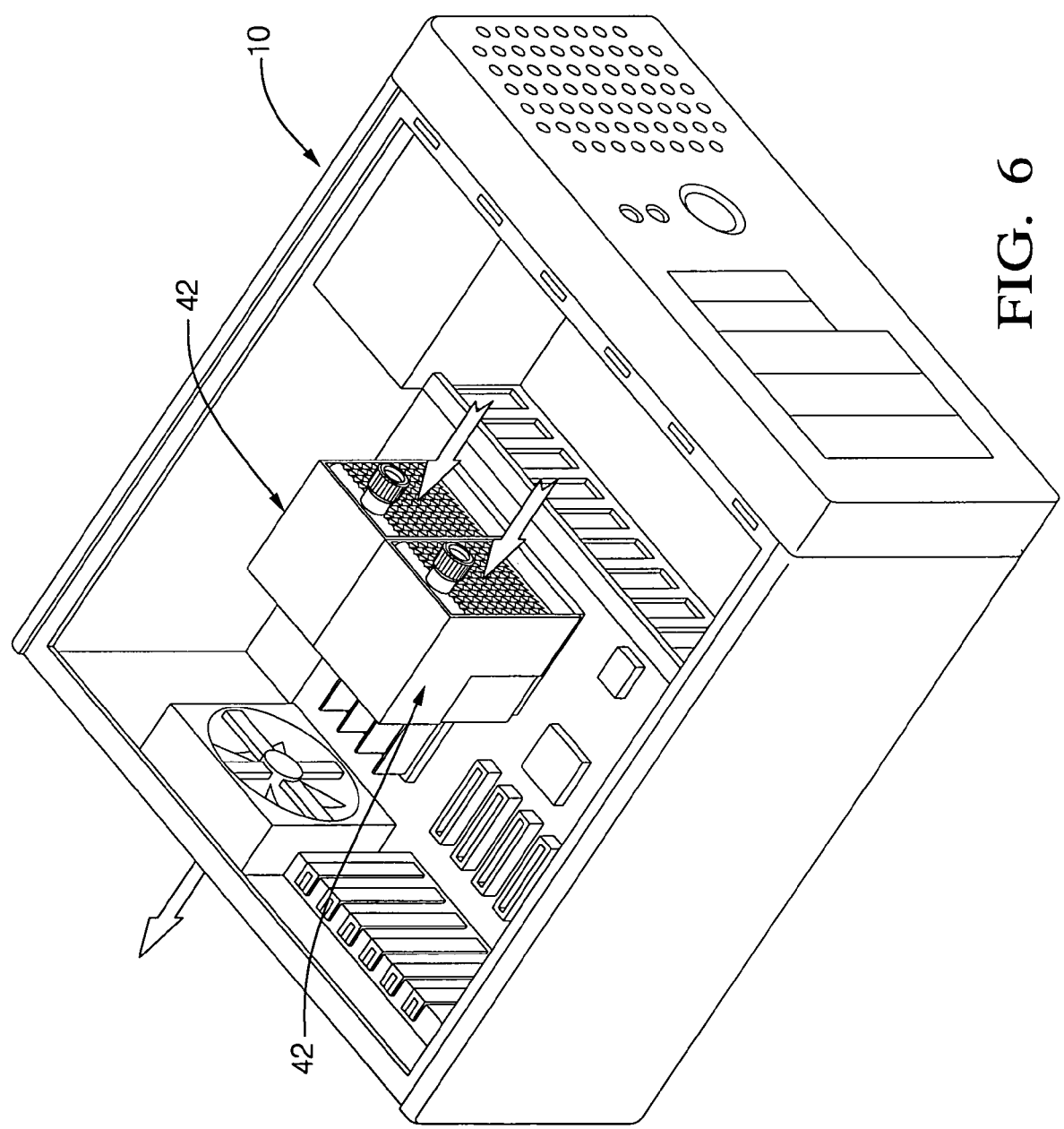
FIG. 6 shows two modules within a conventional computer case.

Referring next to FIG. 6, another advantage of the modular unit 42 is its unique ability to be retro fitted into an existing case 10 in a self scaling fashion. Different architectures may have more than one CPU 14 within the same case 10, two as disclosed in FIG. 6. Two or more modules 42 can be used, one for each component to be cooled, with no other significant modifications. In addition, a module like 42 could be used internally to an environment like case 10, with its pre existing air stream drawn from ambient, or directly exposed to ambient in a stand alone application. The module 42 of the invention thereby provides multiple advantages of compactness, optimal efficiency and space utilization, easy retro fitting, self scaling and flexibility, all from essentially existing components arranged in the novel fashion disclosed.

Variations in the disclosed embodiment could be made. While CPUs are generally square or rectangular,

The invention claimed is:

1. A modular liquid cooling system for a heat producing electronic component having a generally planar exposed surface from which heat is to be extracted, comprising,
   a structural base sized to fit above the exposed surface of the component, said base having a central opening,
   a cold plate mounted to said base below said central opening with a lower surface adapted to be thermally bonded to said component exposed surface,
   a puller type fan unit installed above said base on one side of said base central opening,
   a pump unit installed on the same side of said base in alignment with said fan unit,
   a liquid to air heat exchanger installed above said base and having a face area substantially equal to the area occupied by said fan unit and pump unit together, said heat exchanger being installed on the opposite side relative to said fan and pump unit and spaced from said fan unit by a critical distance,
   liquid lines running through said base central opening to said cold plate and interconnecting said cold plate, pump unit and heat exchanger for the pumping of liquid coolant therethrough by said pump unit, said liquid lines being arranged so as to leave the space between said fan unit and heat exchanger substantially unobstructed, and,
   a shroud mounted to said base and enclosing said base, fan unit, pump unit and lines so as to substantially block the flow of air at all points except said fan unit and said air to liquid heat exchanger, whereby, said module may be installed by thermally bonding said cold plate to said component surface, after which air pulled out of the interior of said shroud is made up by air pulled through said heat exchanger, said critical distance being sufficient to assure that air is pulled through substantially the entire face area of said heat exchanger.

2. A modular liquid cooling system according to claim 1, further characterized in that said base is substantially rectangular, and said heat exchanger has a substantially planar face area.

3. A modular liquid cooling system according to claim 2, further characterized in that said fan unit is placed below said pump unit.

4. In a case containing a heat producing electronic component having at least one generally planar exposed surface from which heat is to be extracted, and having an available unoccupied volume above said electronic component, said case also having a pre existing cooling air stream therethrough in a defined direction, a modular liquid cooling system, comprising,
   a structural base sized to fit above the exposed surface of the component, said base having a central opening,
   a cold plate mounted to said base below said central opening with a lower surface adapted to be thermally bonded to said component exposed surface,
   a puller type fan unit installed above said base on one side of said base central opening,
   a pump unit installed on the same side of said base in alignment with said fan unit in a vertical stack that fits within said available volume,
   a liquid to air heat exchanger installed above said base and having a face area substantially equal to the area occupied by said fan unit and pump unit together, said heat exchanger being installed on the opposite side relative to said fan and pump unit and spaced from said fan unit by a critical distance,
   liquid lines running through said base central opening to said cold plate and interconnecting said cold plate, pump unit and heat exchanger for the pumping of liquid coolant therethrough by said pump unit, said liquid lines being arranged so as to leave the space between said fan unit and heat exchanger substantially unobstructed, and,
   a shroud mounted to said base and enclosing said base, fan unit, pump unit and lines within said available volume so as to substantially block the flow of air at all points except said fan unit and said air to liquid heat exchanger, whereby, said module may be installed by thermally bonding said cold plate to said component surface with said fan unit oriented so as to pull air in substantially the same direction as said pre existing air stream within said case, after which air pulled out of the interior of said shroud is made up by air pulled through said heat exchanger, said critical distance being sufficient to assure that air is pulled through substantially the entire face area of said heat exchanger.

5. A modular liquid cooling system according to claim 4, further characterized in that said case has a floor above which said electronic component is mounted, and said base is adapted to be mounted to said case floor so as to bias said cold plate to said component exposed surface.

* * * * *